US012612072B2

(12) United States Patent　　　　(10) Patent No.:　　US 12,612,072 B2
Gunya　　　　　　　　　　　　　　　(45) Date of Patent:　　Apr. 28, 2026

(54) VEHICLE CONTROL SYSTEM

(71) Applicant: TOYOTA JIDOSHA KABUSHIKI KAISHA, Toyota (JP)

(72) Inventor: Koichi Gunya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/826,456

(22) Filed: Sep. 6, 2024

(65) Prior Publication Data

US 2025/0242832 A1　　　Jul. 31, 2025

(30) Foreign Application Priority Data

Jan. 30, 2024　(JP) ................................. 2024-011894

(51) Int. Cl.
　　*B60W 60/00*　　　　(2020.01)
(52) U.S. Cl.
　　CPC ..... *B60W 60/001* (2020.02); *B60W 2554/406* (2020.02)
(58) Field of Classification Search
　　CPC ......... B60W 60/001; B60W 2554/406; B60W 2540/215; B60W 50/082; B60W 50/10
　　See application file for complete search history.

(56) References Cited

U.S. PATENT DOCUMENTS 8,405,491 B2 * 3/2013 Fong ...................... G06V 20/58
　　　　　　　　　　　　　　　　　　　348/148
9,623,878 B2 * 4/2017 Tan ...................... B60W 10/04

2016/0114805 A1 * 4/2016 Yang ........................ B60Q 3/80
　　　　　　　　　　　　　　　　　　　701/1
2017/0313324 A1 * 11/2017 Kumai .................. B60W 40/02
2018/0319402 A1 * 11/2018 Mills ...................... B60W 10/04
2019/0061778 A1 * 2/2019 Chen ................... B60W 50/082
2019/0084557 A1 * 3/2019 Nakade .............. B62D 15/0285

FOREIGN PATENT DOCUMENTS

CN　　　111886171 A　*　11/2020　.......... G06N 3/0464
JP　　　2020180870 A　*　11/2020
JP　　　2022-022075 A　　2/2022

OTHER PUBLICATIONS

Machine Translation: JP-2020180870-A (Year: 2020).*
Machine Translation: CN-111886171-A (Year: 2020).*

* cited by examiner

*Primary Examiner* — Anne Marie Antonucci
*Assistant Examiner* — Connor L Knight
(74) *Attorney, Agent, or Firm* — SoraIP, Inc.

(57)　　　　　　　ABSTRACT

The vehicle control system stores the latest selection result of the driver regarding whether or not to use the driving assistance control function in the storage device. When the operation condition of the driving assistance control function is satisfied, the vehicle control system activates the driving assistance control function without inquiring the driver whether to use the driving assistance control function when the latest selection result is to use the driving assistance control function. When the operation condition of the driving assistance control function is satisfied, the vehicle control system does not operate the driving assistance control function without inquiring the driver whether to use the driving assistance control function when the latest selection result is that the driving assistance control function is not used.

2 Claims, 5 Drawing Sheets

10: VEHICLE CONTROL SYSTEM

FIG. 5

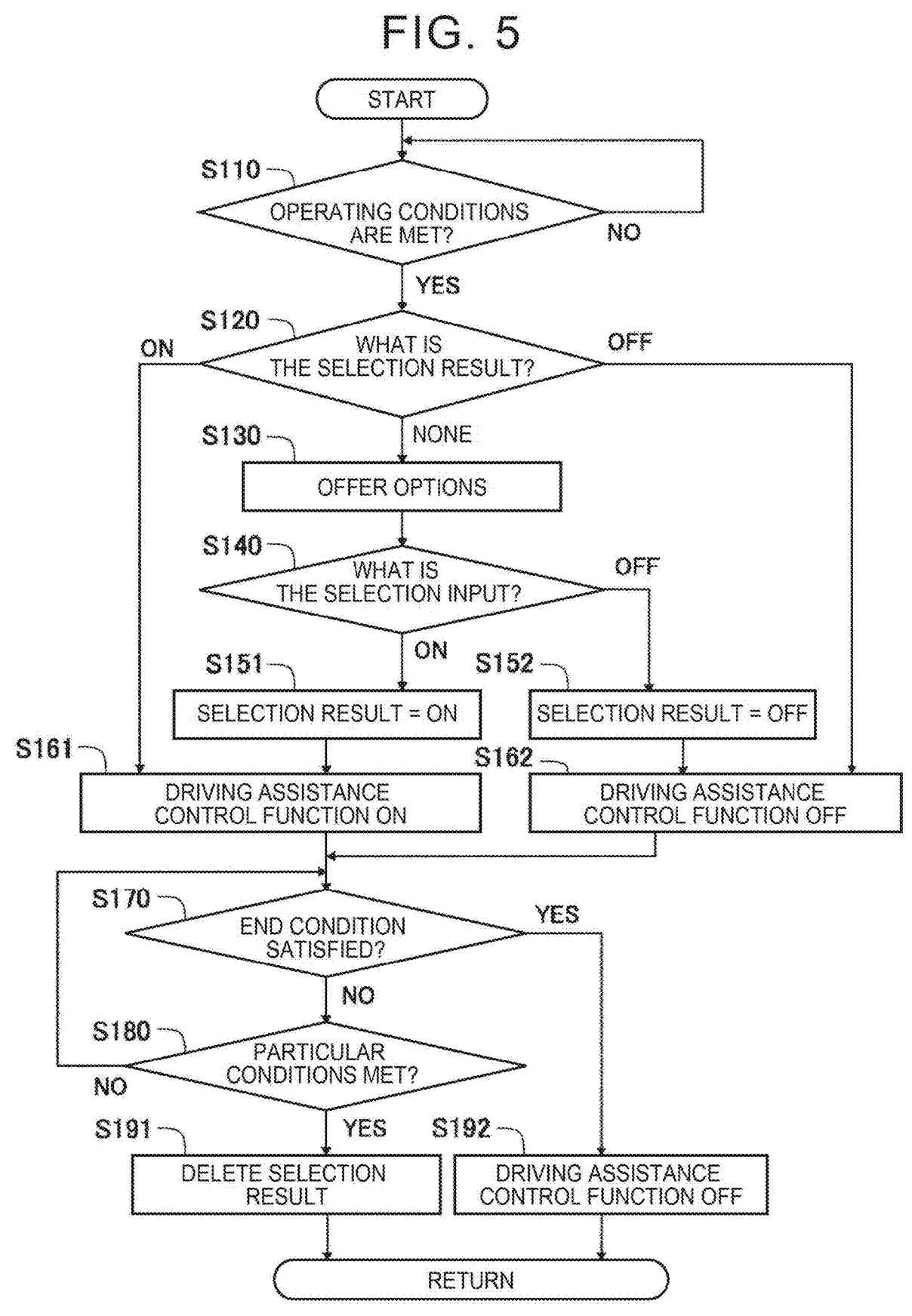

START

S110 — OPERATING CONDITIONS ARE MET?

NO

YES

S120 — WHAT IS THE SELECTION RESULT?

ON

OFF

NONE

S130 — OFFER OPTIONS

S140 — WHAT IS THE SELECTION INPUT?

OFF

ON

S151 — SELECTION RESULT = ON

S152 — SELECTION RESULT = OFF

S161 — DRIVING ASSISTANCE CONTROL FUNCTION ON

S162 — DRIVING ASSISTANCE CONTROL FUNCTION OFF

S170 — END CONDITION SATISFIED?

YES

NO

S180 — PARTICULAR CONDITIONS MET?

NO

YES

S191 — DELETE SELECTION RESULT

S192 — DRIVING ASSISTANCE CONTROL FUNCTION OFF

RETURN

VEHICLE CONTROL SYSTEM

CROSS-REFERENCE TO RELATED APPLICATION

This application claims priority to Japanese Patent Application No. 2024-011894 filed on Jan. 30, 2024, incorporated herein by reference in its entirety.

BACKGROUND

1. Technical Field

The present disclosure relates to a driving assistance control function that assists with driving of a vehicle.

2. Description of Related Art

In Japanese Unexamined Patent Application Publication No. 2022-022075 (JP 2022-022075 A), a vehicle control device that is applied to a vehicle having a plurality of driving modes of different automation levels for driving operations is disclosed. When switching to an automated driving mode, the vehicle control device requests a user (driver) to perform an operation in accordance with the automation level at that time. The operation for switching to the automated driving mode is configured to be simpler, the higher the automation level at that time is.

SUMMARY

A case in which a driver drives a vehicle having a driving assistance control function will be considered. In determining whether to operate the driving assistance control function, there is a concern that the driver may feel irksome, due to being frequently requested to perform the selection operation. JP 2022-022075 A discloses technology for simplifying necessary operations in accordance with the automation level at the time of switching operation modes, but the operations are not completely omitted.

An object of the present disclosure is to provide technology that enables omission of operations by a driver when deciding whether to operate a driving assistance control function.

A first aspect relates to a vehicle control system equipped with a driving assistance control function for assisting driving of a vehicle.

The vehicle control system includes
one or more storage devices, and
one or more processors.
The one or more storage devices
store a most-recent selection result of a driver regarding whether to use the driving assistance control function.
The one or more processors may,
when the most-recent selection result is to use the driving assistance control function at a time of an operation condition of the driving assistance control function being satisfied, operate the driving assistance control function, without inquiring of the driver whether to use the driving assistance control function.
The one or more processors may,
when the most-recent selection result is not to use the driving assistance control function at a time of the operation condition of the driving assistance control function being satisfied, not operate the driving assistance control function, without inquiring of the driver whether to use the driving assistance control function.

When deciding whether to operate the driving assistance control function, the vehicle control system refers to the most-recent selection result of the driver, thereby omitting providing the driver with options, as appropriate. Thus, the irksomeness felt by the driver due to frequently being presented with options can be suppressed, while reflecting intentions of the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flow chart illustrating an exemplary flow of a process related to ON/OFF determination of a driving assistance control function.

DETAILED DESCRIPTION OF EMBODIMENTS

1. Advanced Vehicle Control System

Figure 1:
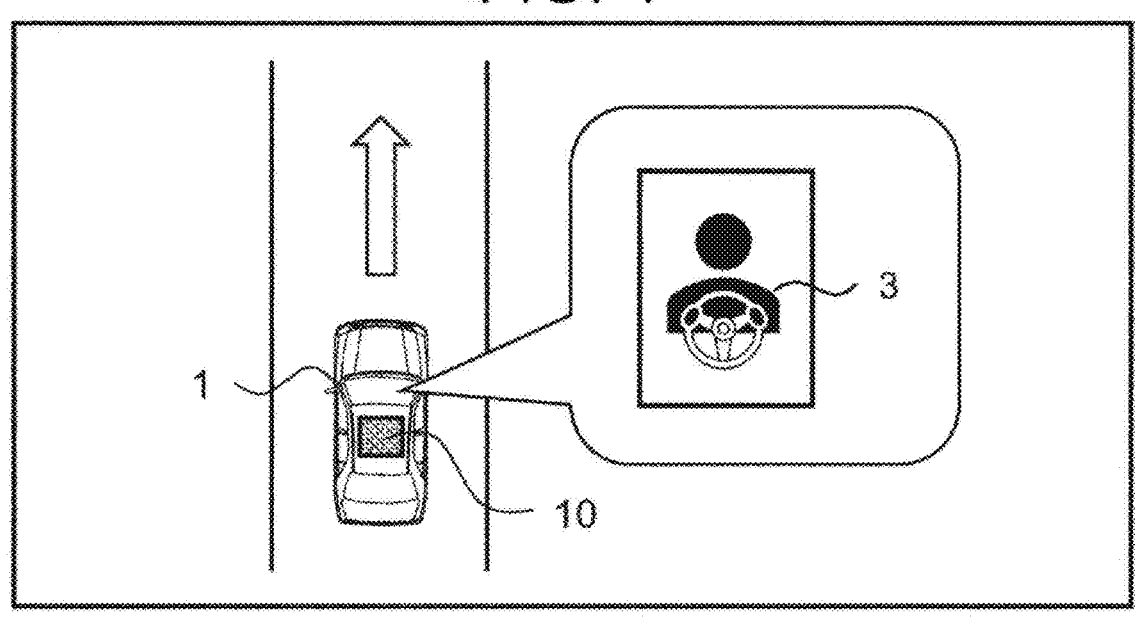
FIG. 1 is a schematic diagram of a vehicle and a vehicle control system.

FIG. 1 is a diagram illustrating an outline of a vehicle 1 and a vehicle control system 10. The vehicle control system 10 is applied to the vehicle 1 driven by the driver 3 and controls the vehicle 1. For example, the vehicle control system 10 includes a driving assistance control function that supports driving of the vehicle 1.

Figure 2:
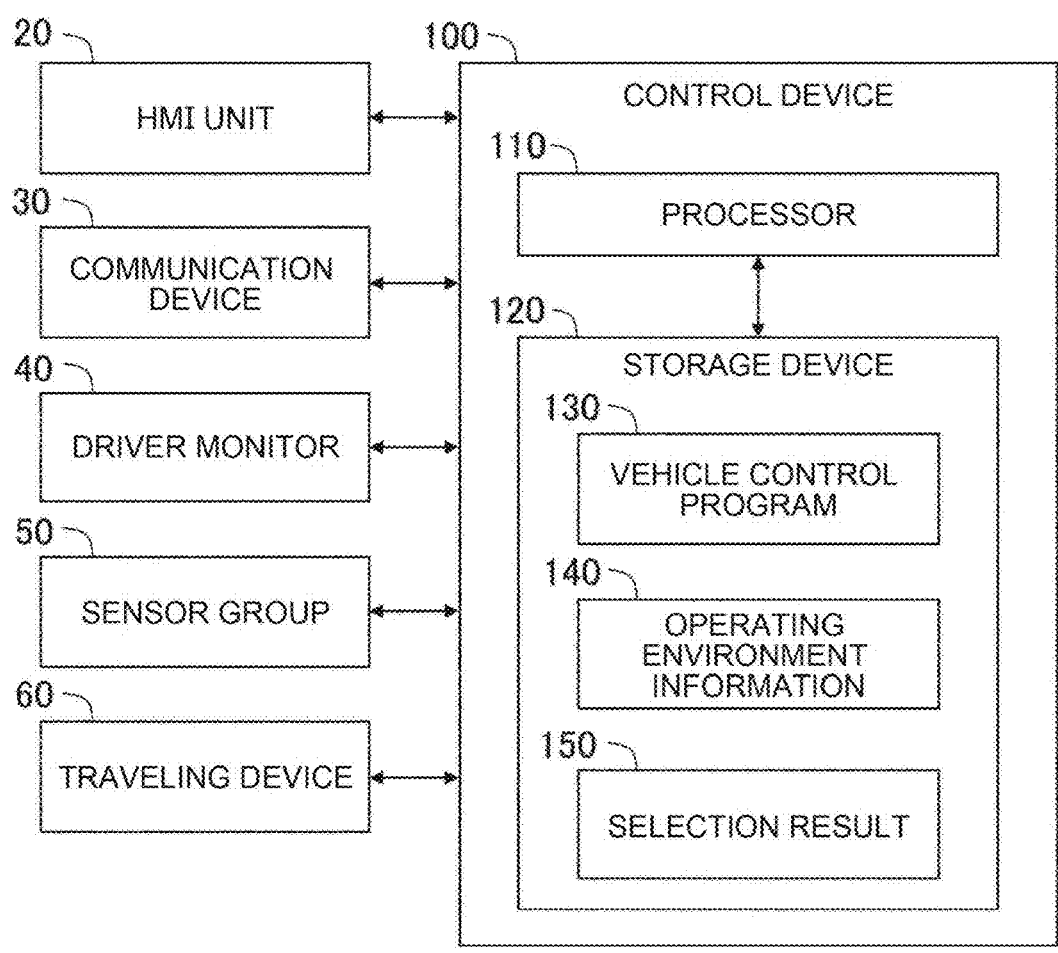
FIG. 2 is a diagram illustrating a configuration example of a vehicle control system.

FIG. 2 is a diagram illustrating a configuration example of the vehicle control system 10. The vehicle control system 10 includes an HMI (human machine interface) unit 20, a communication device 30, a driver monitor 40, a sensor group 50, a traveling device 60, and a control device 100.

HMI unit 20 is an interface for providing information to the driver 3 and receiving information from the driver 3. Specifically, HMI unit 20 includes an inputting device and an outputting device. Examples of the input device include a touch panel, a switch, and a microphone. Examples of the output device include a display device, a speaker, and the like. Examples of the display device include a liquid crystal panel and an organic EL panel.

The communication device 30 communicates with the outside of the vehicle 1. An example of the communication device 30 is a beacon for receiving road traffic information. The road traffic information includes traffic congestion information, required time, traffic restriction information, and the like.

The driver monitor 40 is a device for detecting the state and operation of the driver 3. For example, the driver monitor 40 includes a camera installed at a position where the driver 3 can be imaged. By analyzing the image obtained by the camera, it is possible to detect the orientation, the line of sight, the eye opening degree, the opening degree, and the like of the face of the driver 3. The driver monitor 40 may include a steering touch sensor installed on a steering wheel operated by the driver 3. The driver monitor 40 may detect a driving operation by the driver 3.

The sensor group 50 includes a recognition sensor, a vehicle state sensor, a position sensor, and the like. The recognition sensor recognizes (detects) a situation around the vehicle 1. Examples of recognition sensors include cameras, LIDAR (Laser Imaging Detection and Ranging), radars, and the like. The vehicle state sensor detects a state of the vehicle 1. The vehicle state sensor includes a speed sensor, an acceleration sensor, a yaw rate sensor, a steering angle sensor, and the like. The position sensor detects a position and an azimuth of the vehicle 1. For example, the position sensor includes a GNSS (Global Navigation Satellite System).

The traveling device 60 includes a steering device, a driving device, and a braking device. The steering device will turn the wheel. For example, the steering device includes a power steering (EPS: Electric Power Steering) device. The driving device is a power source that generates a driving force. Examples of the driving device include an engine, an electric motor, and an in-wheel motor. The braking device generates a braking force.

The control device 100 is a computer that controls the vehicle 1. The control device 100 includes one or more processors 110 (hereinafter simply referred to as processors 110) and one or more storage devices 120 (hereinafter simply referred to as storage devices 120). The processor 110 executes various processes. For example, the processor 110 includes a CPU (Central Processing Unit). The storage device 120 stores various types of information. Examples of the storage device 120 include volatile memory, non-volatile memory, HDD (Hard Disk Drive), SSD (Solid State Drive), and the like.

The vehicle control program 130 is a computer program executed by the processor 110. The function of the control device 100 is realized by the cooperation of the processor 110 executing the vehicle control program 130 and the storage device 120. The vehicle control program 130 is stored in the storage device 120. Alternatively, the vehicle control program 130 may be recorded in a computer-readable recording medium.

The control device 100 acquires the driving environment information 140 indicating the driving environment of the vehicle 1 by using the sensor group 50. The driving environment information 140 is stored in the storage device 120.

The driving environment information 140 includes surrounding situation information indicating a recognition result by the recognition sensor. For example, the surrounding situation information includes an image captured by the camera. The surrounding situation information may include object information about an object in the vicinity of the vehicle 1. Examples of objects around the vehicle 1 include pedestrians, other vehicles (preceding vehicles, parked vehicles, and the like), lane boundary lines (white lines), signals, signs, roadside structures, and the like. The object information indicates a relative position and a relative speed of the object with respect to the vehicle 1.

Further, the driving environment information 140 includes vehicle state information indicating a vehicle state detected by the vehicle state sensor.

Further, the driving environment information 140 includes vehicle position information indicating the position and the azimuth of the vehicle 1. The vehicle position information is obtained by a position sensor. Highly accurate vehicle position information may be acquired by a selfposition estimation process (Localization) using map information and surrounding situation information (object information).

Further, the driving environment information 140 includes driver state and operation information obtained by the driver monitor 40.

The control device 100 executes vehicle travel control for controlling travel of the vehicle 1. The vehicle travel control includes steering control, acceleration control, and deceleration control. The control device 100 executes vehicle travel control by controlling the traveling device 60 (steering device, drive device, and braking device).

The control device 100 has a driving assistance control function. That is, the control device 100 performs driving support control for supporting driving of the vehicle 1 as necessary. The driving assistance control includes at least one of a steering control, an acceleration control, and a deceleration control. Examples of such a driving assistance control function include autonomous driving control (autonomous driving control), pass following control (path-following control), and lane keeping assistance control (lane tracing assist control). In addition, collision-avoidance control (collision avoidance control), adaptive cruise control (ACC: Adaptive Cruise Control), hand-off driving assistance control, and the like are exemplified. The autonomous driving level in the case of the autonomous driving control may be a level (so-called level 3 or higher) on the assumption that the driver does not necessarily have to concentrate on the 100% driving. The control device 100 determines whether or not the operating condition of the driving assistance control function is satisfied based on the driving environment information 140. When the operating condition of the driving assistance control function is satisfied, the control device 100 may inquire of the driver 3 whether or not to use the driving assistance control function before activating the driving assistance control function. Details of the inquiry to the driver 3 will be described later.

Figure 3:
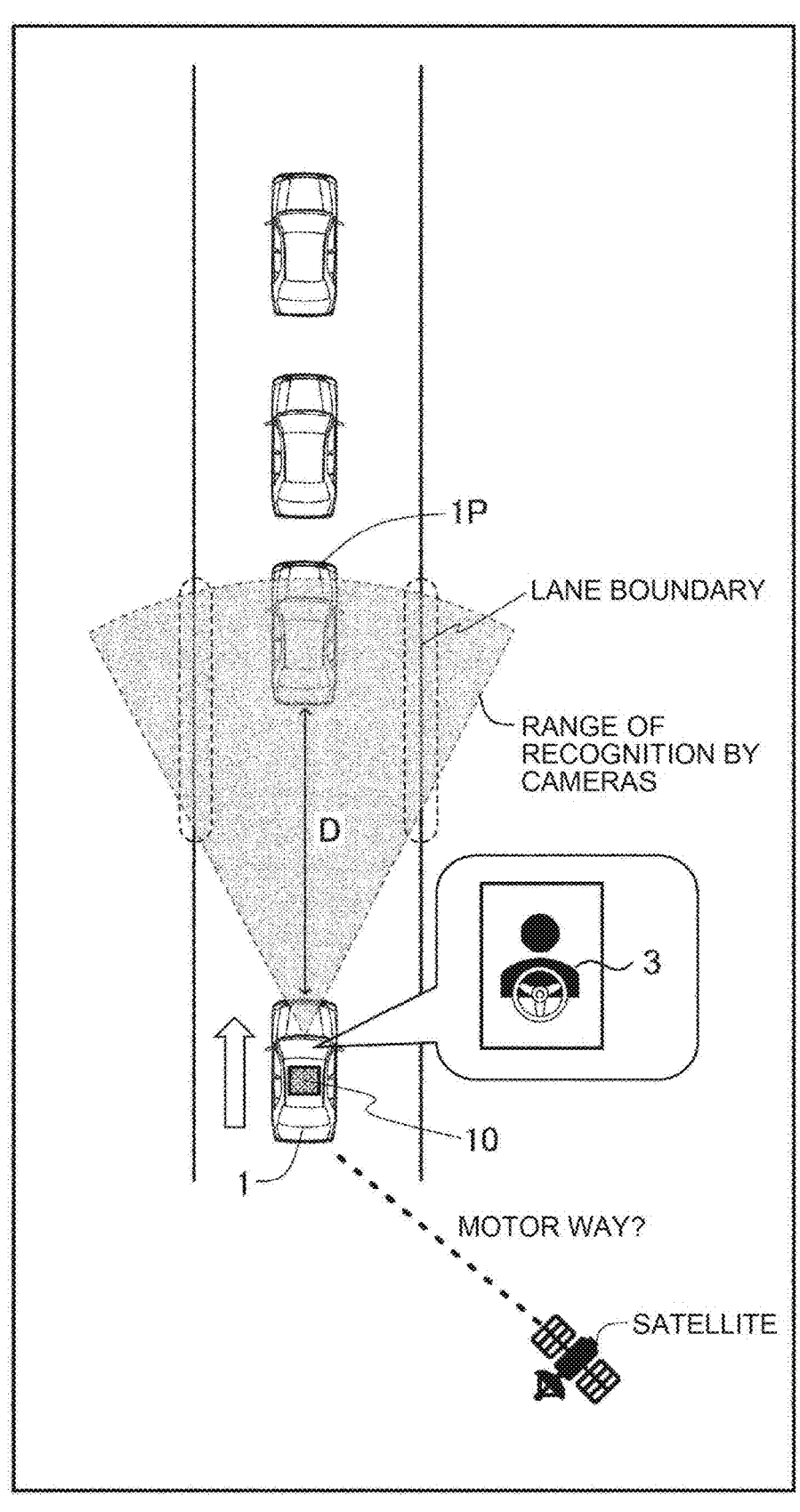
FIG. 3 is a conceptual diagram illustrating a hand-off driving assistance control function, which is an example of a driving assistance control function.

FIG. 3 is a conceptual diagram for explaining a leaving driving assistance control function, which is an example of a driving assistance control function. The release driving assistance control function allows the driver 3 to release the hand from the handle. The leaving driving assistance control function includes, for example, automatically causing the vehicle 1 to follow the preceding vehicle 1P in a traffic jam.

The operating conditions of the leaving driving assistance control function may include, for example, the following conditions 1 to 5. (Condition 1) Vehicle 1 is on an automobile exclusive road. (Condition 2) The speed of the vehicle 1 is less than the threshold value. (3) A preceding vehicle 1P is present in a predetermined distance D ahead of the vehicle 1. (Condition 4) The lane boundary line (white line) is clearly recognized. (Condition 5) The driver 3 faces the traveling direction of the vehicle 1. The control device 100 can determine, based on the driving environment information 140 described above, whether or not the operating condition of the leaving driving assistance control function is satisfied. More specifically, whether or not the condition 1 is satisfied can be determined based on the vehicle position information and the map information. Whether or not the condition 2 is satisfied can be determined based on the vehicle state information. Whether or not the condition 3 is satisfied can be determined based on the surrounding situation information. Whether or not the condition 4 is satisfied can be determined based on the surrounding situation information. Whether or not the condition 5 is satisfied can be determined based on the driver state and the operation information.

The operating conditions of the other driving assistance control functions can also be determined based on the driving environment information 140.

Further, the control device 100 may perform automatic driving control based on the driving environment information 140. For example, the control device 100 generates a travel plan of the vehicle 1 based on the driving environment information 140. Furthermore, the control device 100 generates a target trajectory necessary for the vehicle 1 to travel in accordance with the travel plan based on the driving environment information 140. The target trajectory includes a target position and a target speed. Then, the control device 100 performs vehicle travel control so that the vehicle 1 follows the target trajectory.

Figure 4:
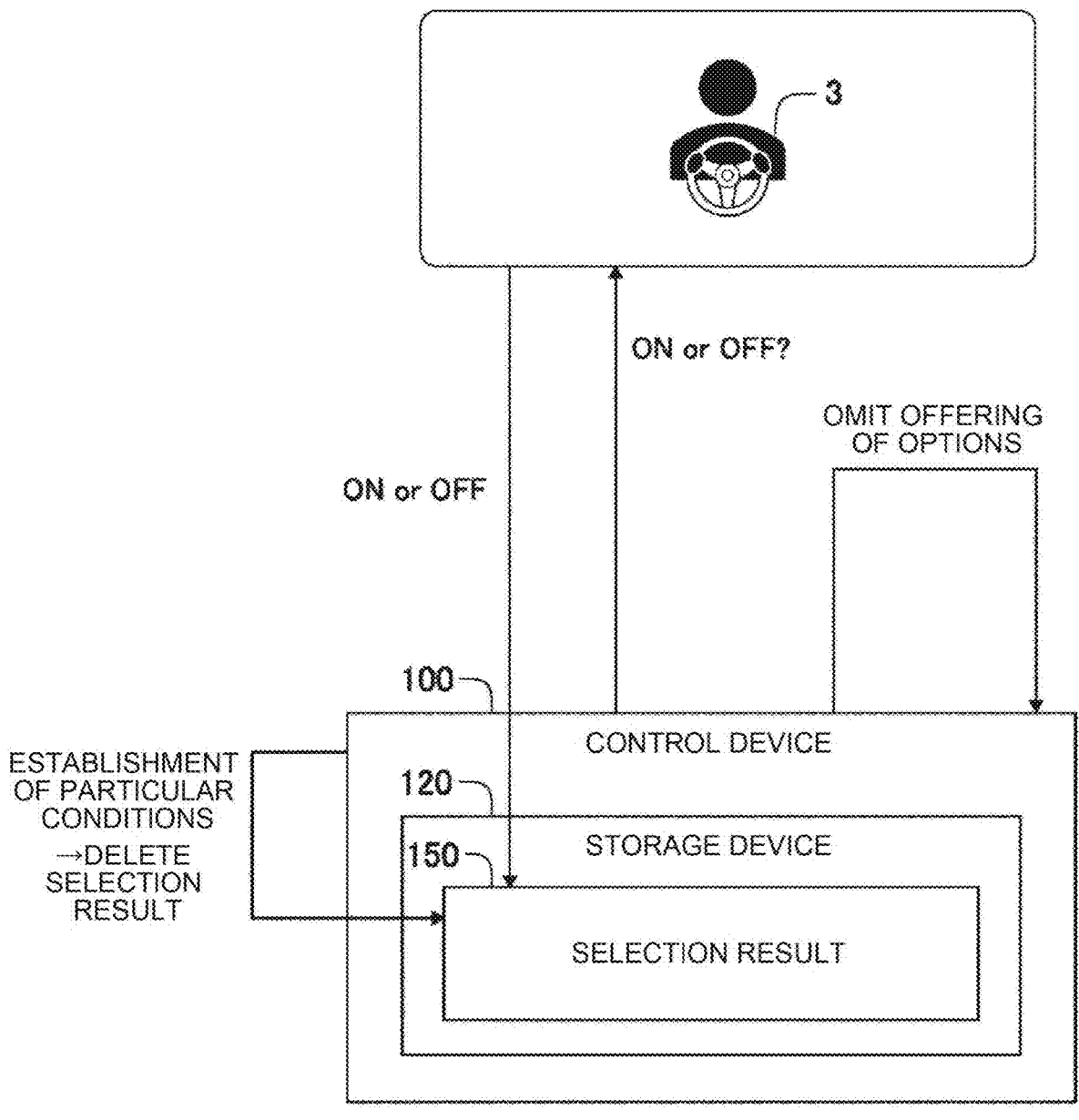
FIG. 4 is a conceptual diagram illustrating an exemplary process related to ON/OFF determination of a driving assistance control function.

2. Process Related to ON/OFF Determination of Driving Assistance Control Function As described above, the control device 100 determines whether or not the operating condition of the driving assistance control function is satisfied. When the operating condition of the driving assistance control function is satisfied, the control device 100 may inquire of the driver 3 whether or not to use the driving assistance control function before activating the driving assistance control function. However, if an inquiry is made to the driver 3 every time the operating condition of the driving assistance control function is satisfied, the driver 3 may feel troublesome. Therefore, the control device 100 automatically determines whether or not to activate the driving assistance control function according to the situation. That is, the control device 100 automatically determines ON/OFF of the driving assistance control function. FIG. 4 is a diagram illustrating an exemplary process related to ON/OFF determination of the driving assistance control function.

2-1. Offering Options

The control device 100 presents options to the drivers 3 via HMI unit 20. The options include a question regarding whether to use the driving assistance control function. A response input by the driver 3 to the option is referred to as "selection input". The content of the selection input is either a content indicating "using the driving assistance control function" (hereinafter referred to as "ON selection") or a content indicating "not using the driving assistance control function" (hereinafter referred to as "OFF selection"). Note that the presentation of the options via HMI unit 20 may be performed visually via a display device or may be provided by sound through a speaker. Similarly, the selection input may be input via a touch panel or voice input via a microphone.

If the selection is a ON selection, the control device 100 activates (turns ON) the driving assistance control function. On the other hand, when the selection is the use selection, the control device 100 does not activate the driving assistance control function (turns OFF). At this time, the control device 100 stores the content of the selection input (whether "ON selection" or "OFF selection") as the selection result 150 in the storage device 120.

The selection result 150 indicates the "latest" selection input performed by the driver 3. That is, once the selection input is stored as the selection result 150 in the storage device 120, and then, if there is a selection input again, the selection result 150 is updated to the content of the selection input that was performed later. In other words, the selection result 150 indicates the latest selection result by the driver 3 regarding whether or not to use the driving assistance control function.

2-2. Omission of Offering Options

The vehicle control system 10 also includes a process path for automatically determining ON/OFF without presenting options. Whether to present or omit an option depends on the contents of the selection result 150. If the selection result 150 does not exist, the control device 100 presents an option as described above. On the other hand, when the selection result 150 is present, the control device 100 automatically determines ON/OFF by omitting the presentation of the option. Specifically, when the selection result 150 is a ON selection, the control device 100 turns ON the driving assistance control function. On the other hand, when the selection result 150 is OFF selection, the control device 100 turns OFF the driving assistance control function. In other words, the control device 100 performs ON/OFF determination according to the content of the most recent selection entry (i.e., the selection result 150).

In the case where the selection result 150 does not exist, it is considered that the operating condition of the driving assistance control function is not satisfied once after the driver 3 starts the driving of the vehicle 1. In addition, when the particular condition is satisfied, the control device 100 deletes the selection result 150. The process of deleting the selection result 150 can be said to be a preparation stage in which the option is presented again.

2-3. Process Flow

FIG. 5 is a flow chart illustrating an exemplary flow of a process related to ON/OFF determination of a driving assistance control function.

In S110, the control device 100 determines whether or not the operation condition of the driving assistance control function is satisfied. When the operating condition of the driving assistance control function is satisfied (S110; Yes), the process proceeds to S120. When the operating condition of the driving assistance control function is not satisfied (S110; No), the process repeats the determination of S110.

In S120, the control device 100 refers to the content of the selection result 150 stored in the storage device 120. If the selection result 150 is a ON selection, the process proceeds to S161. If the selection result 150 is a OFF selection, the process proceeds to S162. If the selection result 150 does not exist, the process proceeds to S130.

In S130, the control device 100 presents an option to the drivers 3. That is, it can be said that S130 is a step of confirming whether the intention of the drivers 3 is ON selection or OFF selection. The process then proceeds to S140.

In S140, the control device 100 determines the following process based on the selection by the driver 3. If the selection entry is a ON selection, the process proceeds to S151. If the selection entry is a OFF selection, the process proceeds to S152.

In S151, the control device 100 stores the content of S140 selection (that is, ON selection) as the selection result 150 in the storage device 120. The process proceeds to S161.

In S161, the control device 100 activates (turns ON) the driving assistance control function. The path from S120 to the direct S161 is ON selected by the selection result 150. Therefore, this path is a step in which the control device 100 determines that the intention of the driver 3 is the same as that at the time of the previous selection input, and decides to activate the driving assistance control function by omitting the re-presentation of the option. On the other hand, the route from S120 to S161 via S130, S140 and S151 does not have the selection result 150. For this reason, this path is a step in which the control device 100 determines to activate the driving assistance control function after presenting an option and confirming the intention of the driver 3. The process then proceeds to S170.

In S152, the control device 100 stores the content of S140 selection (that is, OFF selection) as the selection result 150 in the storage device 120. The process proceeds to S162.

In S162, the control device 100 determines (turns OFF) that the driving assistance control function is not activated. The path from S120 to the direct S162 is OFF selected by the selection result 150. Therefore, this path is a step in which the control device 100 determines that the intention of the driver 3 is the same as that at the time of the previous selection input, and decides not to activate the driving assistance control function by omitting the re-presentation of the option. On the other hand, the route from S120 to S162 via S130, S140 and S152 does not have the selection result 150. For this reason, this route is a step in which the control device 100 determines not to activate the driving assistance control function after confirming the intention of the driver 3 by presenting an option. The process then proceeds to S170.

In S170, the control device 100 determines whether or not the driving assistance control is terminated. When the end condition of the driving assistance control is satisfied, it means that the operating condition of the driving assistance control is not satisfied. When the driving assistance control is terminated (S170; Yes), the process proceeds to S192. On the other hand, when the driving assistance control termination condition is not satisfied (S170; No), the process proceeds to S180.

In S192, the control device 100 turns OFF the driving assistance control function. At this time, if the driving assistance control function is OFF in S162, the control device 100 continues OFF condition. Thereafter, the process returns to the start.

In S180, the control device 100 determines whether a particular condition is satisfied. As described above, the particular condition is a condition that triggers deletion of the selection result 150. When the particular condition is satisfied (S180; Yes), the process proceeds to S191. If the particular condition is not satisfied (S180; No), the process returns to S170.

In S191, the control device 100 deletes the selection result 150 stored in the storage device 120. Thereafter, the process returns to the start.

Consider a case where the process returns to the start after S191. In this case, if the process goes through S110 to S120, the process proceeds to S130 because the selection result 150 has been deleted in S191. That is, the control device 100 presents an option to the driver 3.

Consider a case where the process returns to the start after S192. In this case, if the process goes through S110 to S120, since the selection result 150 has not been deleted, the control device 100 performs ON/OFF determination by omitting the presentation of the option based on the selection result 150. That is, the process proceeds directly from S120 to S161 or S162.

The deletion of the selection result 150 is optimally performed when the intention of the driver 3 regarding ON/OFF of the driving assistance control function has changed from the time of the previous selection input. For example, the driver 3 once selected ON of the driving assistance control function, but it is now considered to be OFF. Also, although the driver 3 once turns OFF the driving assistance control function, it is desirable that the selection result 150 be deleted even if the driver wants to turn ON at present. Therefore, the particular condition in S180 can be said to be "a condition where the present operating condition (ON/OFF condition) and the intention of the drivers 3 do not coincide" when expressed in a generalized manner. When such a condition is satisfied, it is reasonable to delete the selection result 150 and present an option to confirm the intention of the driver 3. The particular condition may be individually set according to the specific contents of the driving assistance control function. Such embodiments are described below.

2-4. Effect

As described above, when determining ON/OFF of the driving assistance control function, the vehicle control system 10 refers to the selection result 150, omits providing options to the drivers 3 as appropriate, and automatically performs ON/OFF determination. As a result, it is possible to reduce the troublesomeness felt by the driver 3 by presenting the frequent options while reflecting the intention of the driver 3.

In addition, the vehicle control system 10 presents an option to the driver 3 by deleting the selection result 150 when the particular condition is satisfied. That is, the vehicle control system 10 presents an option when it is determined that the intention of the driver 3 is different from that at the time of the previous selection input. Accordingly, when the driver 3 feels the necessity of the selection input, the option is easily presented. That is, it can be said that the vehicle control system 10 is a system capable of flexibly switching the presence or absence of presentation of options.

Figure 6:
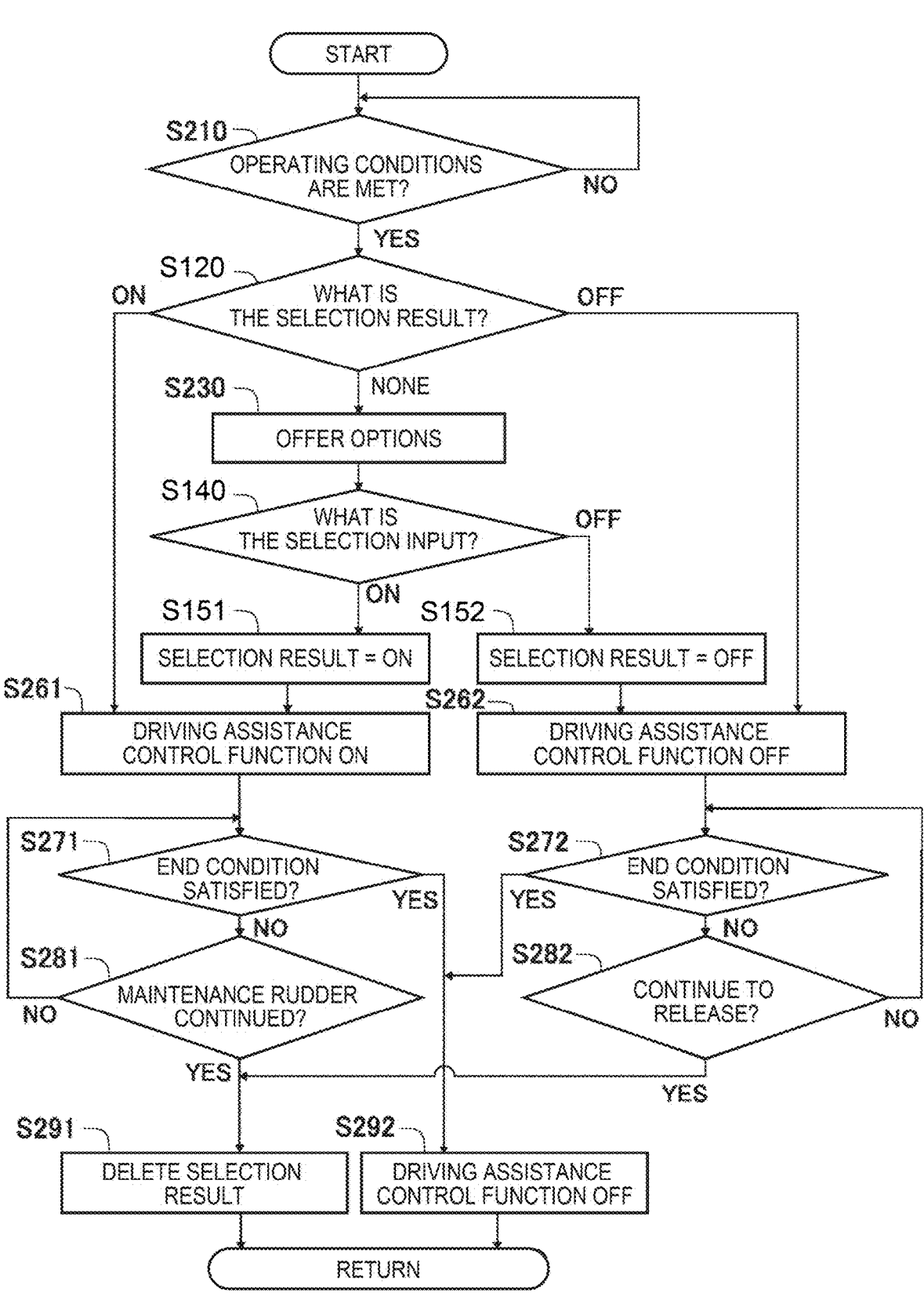
FIG. 6 is a flow chart illustrating an exemplary flow of a process related to ON/OFF determination related to the leaving driving assistance control.

3. Examples of Other Particular Conditions 3-1. In the Case of the Support Control for the Ride Away As described above, the driving assistance control may include a release driving assistance control allowing the driver 3 to release the hand from the steering wheel. FIG. 6 is a flow chart illustrating an exemplary flow of a process related to ON/OFF determination related to the leaving driving assistance control.

The path until the control device 100 makes ON/OFF determination (from start to S261 or S262) is the same as in FIG. 5. The operating conditions of the driving assistance control function in S210 are as described in Section 1.

In S261, after the control device 100 turns ON the driving assistance control function, the process proceeds to S271. In S271, as in S170 of FIG. 5, it is determined whether or not the driving assistance control is terminated. When the driving assistance control is terminated (S271; Yes), the process proceeds to S292. In S292, the control device 100 turns OFF the driving assistance control function, and the process returns to the start. When the driving assistance control is not terminated (S271; No), the process proceeds to S281.

S281 corresponds to the determination (S180) of the particular condition in FIG. 5. Here, the particular condition is "the state in which the driver 3 holds the steering wheel of the vehicle 1 continues for a predetermined time or longer". Whether or not the particular condition is satisfied can be determined based on the driver state and the operation information. If the particular condition is satisfied, the process proceeds to S291. In S291, similar to S191 in FIG. 5, the control device 100 deletes the selection result 150 from the storage device 120, and then the process returns to the start. On the other hand, if S281 particular condition is not satisfied (S281; No), the process returns to S271.

In S262, after the control device 100 turns OFF the driving assistance control function, the process proceeds to S272. In S272, as in S170 of FIG. 5, it is determined whether or not the driving assistance control is terminated. When the driving assistance control is terminated (S272; Yes), the process proceeds to S292. In S292, the control device 100 turns OFF the driving assistance control function, and the process returns to the start. When the driving assistance control is not terminated (S272; No), the process proceeds to S282.

S282 corresponds to the determination (S180) of the particular condition in FIG. 5. Here, it is assumed that the particular condition is "a state in which the driver 3 releases his/her hand from the steering wheel of the vehicle 1 in a state in which the operating condition of the driving assistance control function is satisfied continues for a predetermined time or longer". Whether or not the particular condition is satisfied can be determined based on the driver state and the operation information. If the particular condition is satisfied, the process proceeds to S291. On the other hand, if the particular condition is not satisfied (S282; No), the process returns to S272.

In the following, the significance of setting the particular condition according to the condition of the driver 3 and the steering wheel, such as a S281 or a S282, will be described.

It is assumed that S281 satisfies a particular condition (a condition in which the driver 3 holds the steering wheel of the vehicle 1 continues for a predetermined time or longer). This situation is a situation in which the driver 3 holds the steering wheel even though the leaving driving assistance control function is ON. In such a situation, it can be said that there is a high possibility that the driver 3 does not need the leaving driving support control. Thus, it is reasonable for the control device 100 to S291 the selection results 150 and S230 the option after the process returns to start.

It is assumed that S282 satisfies a particular condition (a condition in which the driver 3 releases his/her hand from the steering wheel of the vehicle 1 continues for a predetermined time or longer). This situation means a situation in which the driver 3 is releasing the hand from the steering wheel even though the release driving assistance control function is OFF. In such a situation, it can be said that there is a high possibility that the driver 3 needs the leaving driving support control. Alternatively, there is a possibility that the driver 3 misunderstands that the leaving driving assistance control is activated. Thus, it is reasonable for the control device 100 to S291 the selection results 150 and S230 the option after the process returns to start.

3-2. Other Particular Conditions

In the following, another example of a particular condition that is a trigger for deleting the selection result 150 is shown (not shown).

Consider a case where the vehicle control system 10 includes a main switch of a driving assistance control function. When the main switch of the driving assistance control function is turned OFF, the control device 100 may delete the selection result 150. Consider a case where, when such a process is set, the driver 3 turns OFF the main switch once and then turns ON the main switch. In this case, since the selection result 150 has been deleted, the control device 100 presents an option. For example, if a considerable amount of time has elapsed from the time when the main-switch is turned OFF to the time when the main-switch is turned ON, there is a possibility that the driving environment (the traffic jam condition, the degree of fatigue of the drivers 3, and the like) has changed. Therefore, it is effective to delete the selection result 150 by such setting and present an option to confirm the intention of the driver 3.

Further, the particular condition may be "the vehicle 1 continuously travels at a place other than the automobile dedicated road for a predetermined time or longer". Whether or not the particular condition is satisfied can be determined based on the vehicle position information and the map information. As a specific example, there may be a case where the vehicle is transferred from an automobile-dedicated road to a general road, a case where the driver 3 takes a break in a service area, or the like. Also in such a case, since there is a high possibility that the driving environment is changing, it is effective to delete the selection result 150 and present an option to confirm the intention of the driver 3.

It is assumed that the driving assistance control function includes a function of causing the vehicle 1 to automatically follow the preceding vehicle 1P in a traffic jam. As a particular condition in this case, "the congestion lasts longer than the congestion time expected at the time when the control device 100 decides not to activate the driving assistance control function" is exemplified. As described above, the vehicle control system 10 can acquire the road traffic information via the communication device 30. This means that it is possible to acquire an expected time in which the congestion continues when the congestion occurs. For example, suppose that the vehicle 1 is involved in a traffic jam and the time of the traffic jam expected at that time is displayed via HMI unit 20. It is assumed that the estimated traffic jam time is such that the driver 3 may drive himself or herself (does not require a driving assistance control function). However, in a case where the traffic jam is prolonged thereafter, there is a possibility that the intention of the driver 3 is changed to the one who desires the driving support control. Therefore, it is effective for the control device 100 to delete the selection result 150 and present an option in accordance with a change in the expected congestion time.

What is claimed is:

1. A vehicle control system equipped with a driving assistance control function for assisting driving of a vehicle, the vehicle control system comprising:

one or more storage devices configured to store a most-recent selection result of a driver regarding whether to use the driving assistance control function; and one or more processors configured to in a case where the most-recent selection result is to use the driving assistance control function and an operation condition of the driving assistance control function is satisfied, operate the driving assistance control function, without inquiring of the driver whether to use the driving assistance control function, in a case where the most-recent selection result is not to use the driving assistance control function and the operation condition of the driving assistance control function is satisfied, not operate the driving assistance control function, without inquiring of the driver whether to use the driving assistance control function, determine that a particular condition is satisfied based on a first condition, a second condition, and a third condition, and delete the most-recent selection result from the one or more storage devices in a case where the particular condition is satisfied, wherein the driving assistance control function allows hands-off operation by the driver from a steering wheel of the vehicle, and automatically causes the vehicle to follow a preceding vehicle during traffic congestion, the first condition is that the hands-off operation continues for at least a first period in a case where the driving assistance control function is not operated and the
operation condition of the driving assistance control
function is satisfied, the second condition is that an actual traffic congestion
duration exceeds, by at least a second period, a traffic
congestion duration predicted at a time when the one or
more processors decide not to activate the driving
assistance control function, and the third condition is that the vehicle is continuously
traveling on a road other than a limited-access highway
for at least a third period.

2. The vehicle control system according to claim 1, further
comprising:

a communication device configured to receive road traffic
information;

a driver monitor configured to detect operation by the
driver; and a sensor configured to detect a situation around the
vehicle.

* * * * *